United States Patent
Geyer et al.

[15] 3,655,558
[45] Apr. 11, 1972

[54] MINERAL LUBRICATING OIL COMPOSITIONS CONTAINING ALKALINE EARTH METAL SULFONATES AND PHOSPHITES AND PROCESS PRODUCING SAME

[72] Inventors: Jerome Geyer, Elizabeth; Shih-En Hu, Westfield; Max L. Robbins, South Orange, all of N.J.

[73] Assignee: Esso Research and Engineering Company

[22] Filed: Apr. 24, 1969

[21] Appl. No.: 819,108

[52] U.S. Cl. ................................. 252/33, 252/18, 252/389, 252/400
[51] Int. Cl. ........................................................ C10m 1/40
[58] Field of Search ........................... 252/33, 389, 400, 18

[56] References Cited

UNITED STATES PATENTS 3,377,283    4/1968    McMillen ............................... 252/33

*Primary Examiner*—Daniel E. Wyman
*Assistant Examiner*—I. Vaughn
*Attorney*—Pearlman and Stahl and Ernest V. Haines

[57] ABSTRACT

Mineral lubricating oil compositions containing oil-soluble overbased alkaline earth metal hydrocarbon sulfonates, employed in internal combustion engines, are improved as to their antirust, sludge inhibiting and/or antiwear properties by incorporating into such compositions, in colloidal form, small amounts, for example 0.01 to 10.0 wt. percent, of the total oil composition, of in situ formed oil-insoluble inorganic alkaline earth metal phosphorus salts derived from the lower oxy or thio acids of phosphorus or from the corresponding oxides or sulfides of phosphorus which, upon hydrolysis, yield the lower oxy or thio acids of phosphorus. The preferred process of preparing such compositions involves the treatment of the neutral or overbased alkaline earth metal sulfonates, either of petroleum origin or of synthetic long chain alkaryl origin, or mineral oil concentrates thereof, and which have been in the past, conventionally employed as oil additives, with up to the stoichiometric amount of the phosphorus acid, thio acid, oxide or sulfide required to at least partially neutralize the free alkalinity of the overbased sulfonate, filtering therefrom any precipitate formed as a result of such treatment of the sulfonate or oil concentrate thereof, and recovering an oil-soluble alkaline earth metal sulfonate product, or oil concentrate thereof, containing colloidal oil-insoluble alkaline earth metal phosphorus compounds of reducing nature formed in situ.

23 Claims, No Drawings

MINERAL LUBRICATING OIL COMPOSITIONS CONTAINING ALKALINE EARTH METAL SULFONATES AND PHOSPHITES AND PROCESS PRODUCING SAME

The present invention is concerned with a novel lubricating oil composition, its method of preparation, and a novel additive, and its method of preparation, for use with lubricating oils. Particularly, the invention is concerned with the preparation of mineral lubricating oil compositions, for use in internal combustion engines, having improved sludge inhibiting properties, wherein such novel compositions by reason of a novel treating process, more fully hereinafter described, are formed. The improved antirust, sludge inhibition and/or antiwear properties resulting come about by reason of the colloidal alkaline earth metal phosphorus compounds of reducing nature that are formed, in situ. The use of overbased oil-soluble alkaline earth metal petroleum sulfonates and the use of oil-soluble overbased alkaline earth metal synthetic long chain alkaryl sulfonates as sludge inhibitors, detergents, and sludge dispersants in mineral lubricating oils is conventional. These compounds or oil concentrates thereof enjoy widespread commercial sale for use in lubricating oils for internal combustion engines wherein it is desired to minimize sludge formation and to maintain a dispersion or suspension of whatever amounts of sludge are formed.

An overbased sulfonate is one containing an excess of alkaline earth metal over that amount required for completely neutralizing the sulfonic acid constituents present in the compound. Usually the overbasing is accomplished, in situ, and usually in a vehicle such as a lubricating oil which is compatible with the lubricating oil compositions into which the additive is to be incorporated. Generally, though not always, the alkaline earth metal is calcium or barium and the treatment of the excess base added is accomplished with carbon dioxide to form colloidal alkaline earth metal carbonate therein. For example, a colloidal dispersion of calcium carbonate is thereupon formed in the oil. The neutralized sulfonate is believed to form a protective coating around the finely divided calcium carbonate particles to thereby prevent the undesirable agglomeration of the colloidal size calcium carbonate crystals. There are many patents which extensively, and in detail, set forth methods for producing the overbased alkaline earth metal sulfonates. See, for example, the disclosures contained in U.S. Pat. Nos. 2,467,176; 2,616,905; 2,695,910; 2,839,470; 2,856,360; 3,057,896 and 3,429,811. Promoters may also be employed, such as nonylphenol and monoethanolamine in the manner disclosed in British Pat. No. 782,058 and U.S. Pat. No. 3,321,399.

Lubricating oils, especially those used for the lubrication of internal combustion engines, are required to withstand severe superatmospheric temperature conditions. Their failure to withstand such temperatures leads to rapid decomposition or oxidation of such oils with the resultant formation of oxidized hydrocarbons, such as carboxylic acids, aldehydes, ketones, and the like. The oxidative degradation of lubricating oils is a problem which has existed for many years and is becoming more pressing for a solution with advancing technology and present day requirements for lubricating oils having temperature stability when temperatures of the oil approach 300° F. to 400° F. under heavy duty service conditions. Many attempts have been made to impart to lubricating oils, operating under severe service conditions, oxidative stability, so that these oils, over longer periods of time, are able to resist oxidative degradation and the attendant accompanying sludge formation and the difficulties encountered by reason of such sludge formation. Corrosion of the metal internal surfaces of engines lubricated with oils is also of grave consideration under these extreme conditions of engine operation. Additionally, nitrogen in the air introduced into combustion chambers and subjected to combustion becomes fixed so that nitrates are eventually formed. These oxidized substances find their way into the crankcase and become mixed with the lubricating oil. Such substances are undesirable because they also react to form deposits in the oil.

In the past, the formation of degradation products has been diminished to some extent by the addition of organic oxidation inhibiting agents to the oils for the purpose of lessening or delaying sludge formation. In many instances, although these objectives are accomplished because of the nature of the specific additive employed, other characteristics such as thermal stability, changes in viscosity, viscosity index, and lubricity, etc. are simultaneously adversely affected. Most of the organic addition agents heretofore employed have a high degree of oil solubility because it is desired that these agents intimately contact all portions of the oil, the bearing surfaces, and the internal metal surfaces of the engine during its operation. Many times it has been necessary to add an excess of these organic inhibiting substances in order that the point at which they have been completely consumed or broken down will substantially coincide with the point and time of use at which the oil will normally be replaced. However, such "overcharging" of the oil with an oxidation inhibitor sometimes results in a tendency to accelerate the sludge formation in the oil either because of the inherent increased acidity or alkalinity of the additive employed, its thermal instability, and/or by reason of some adverse synergistic or catalytic effect imparted to the oil during use. The problem has most always been attacked by attempting to homogeneously distribute the desired antioxidant or neutralizing agent to the entire quantity of the oil present in the engine for the entire length of time that the oil is present in the engine. This, of course, has meant that the additive must be completely soluble or almost completely soluble in the oil.

The overbased sulfonates used as reactants in the instant novel process are prepared conventionally by dispersing the sulfonic acid and/or metal sulfonate in a hydrocarbon oil, e.g., a petroleum lubricating oil, adding a promoter to the dispersion, thereafter adding lime or other alkaline earth metal basic compounds to the resulting mixture and then blowing a stream of carbon dioxide through the mixture of reactants. Conditions are maintained during the reaction so that a portion, but not all, of the water formed by reaction of the alkaline earth metal base with carbon dioxide to give alkaline earth metal carbonate is removed from the reaction mixture. It has been found most advantageous to control conditions so that about 60 to about 80 percent of the water that is formed during the reaction is continuously removed. If too little water is allowed to remain in the reaction mixture, the reaction will not proceed. If too much of the water in the mixture is permitted to remain, colloidal agglomeration results, causing haze and precipitation with a consequent lowering of the total base number (TBN) of the reaction product. A minimum but controlled amount of water is desirable. See U.S. Pat. No. 3,429,811.

The starting sulfonates that are to be overbased can be salts of any of the metals whose sulfonates have been used in the art, including those of sodium, lithium, potassium, iron, aluminum, zinc, manganese, cadmium, etc. The novel process is particularly applicable to the use of the overbased alkaline earth metal sulfonate salts, including calcium, strontium, magnesium, and barium salts, and it is especially applicable to the use of high total base number calcium or barium sulfonates. Sulfonates having total base numbers up to and including 400 are employed as starting materials.

Sulfonic acids used in this art are classified generally as either petroleum sulfonic acids or synthetic sulfonic acids. Petroleum sulfonic acids are produced by treating petroleum fractions, usually lubricating oil distillate fractions, the so-called white oil distillates, or other petroleum fractions, e.g., petrolatum, with suitable sulfonating agents, including sulfur trioxide, concentrated sulfuric acid and fuming sulfuric acid. Synthetic sulfonic acids are prepared by treating relatively pure synthetic alkaryl hydrocarbons in the same manner.

Synthetic sulfonic acids are usually prepared by sulfonating alkylated aromatic hydrocarbons having alkyl groups totalling about 10 to 33 carbon atoms, e.g., sulfonated products of alkylated aromatics: such as benzene, toluene, xylene, and naphthalene, which are alkylated with wax hydrocarbons, olefins, olefin polymers, etc. Typically, benzene is alkylated with polymers of propylene or butylene, e.g., propylene or isobutylene trimer or tetramer and then sulfonated. The natural or synthetic sulfonic acids used in this invention include alkane sulfonic acids, aromatic sulfonic acids, alkaryl sulfonic acids and aralkyl sulfonic acids. Specific details on the preparation of sulfonic acids having molecular weights of 400 to 1,900, preferably of 450 to 900, for example, and their overbasing need not be given here because such treatment of hydrocarbons is conventional and well known to the art as exemplified by the heretofore cited patents as well as many other patents that could be cited.

It has now been discovered that it is possible to form, in situ, in colloidal form, alkaline earth metal phosphorus compounds having a reducing action, in conjunction with the heretofore mentioned sulfonates. Through the simple expedient of treating the overbased alkaline earth metal sulfonic acid salts which have conventionally been employed in mineral lubricating oils, with up to the stoichiometric amount of a lower valent oxy acid of phosphorus required to completely neutralize the free alkalinity of such overbased sulfonates, the resultant colloidal alkaline earth metal phosphorus compound, formed in situ, has the ability to act as a reducing agent. In place of using such a lower valent oxy acid of phosphorus, the corresponding anhydride (oxide) of such acids may also be used. In this description and the accompanying claims, the term "lower oxy acids of phosphorus" is intended to include the oxides of phosphorus which upon hydrolysis yield the lower valent oxy acids of phosphorus. The definition and scope of the expression "lower oxy acids of phosphorus" is as set forth in "Phosphorus and Its Compounds," Van Wazer, Vol. 1, page 346 (1958). The expression is also intended to include the corresponding anhydrides, (oxides), thio acids, and thio anhydrides (sulfides). Specifically, any phosphorus compound containing oxygen and phosphorus only, sulfur and phosphorus only, containing oxygen, phosphorus and hydrogen only, or sulfur, phosphorus and hydrogen only, and which has a reducing action, i.e., is capable of further oxidation, is suitable for use as a treating agent and reactant for the overbased alkaline earth metal sulfonates heretofore known in the art and which are conventionally employed as sludge dispersants in mineral lubricating oil compositions.

Specifically, the lower oxy acids and thio acids of phosphorus include: hypophosphorous acid, metaphosphorous acid, pyrophosphorous acid, orthophosphorous acid and hypophosphoric acid as well as the anhydrides, phosphorus trioxide, phosphorus tetraoxide, phosphorus sesquioxide and the corresponding sulfur analogues. The colloidal, in situ, formation of the alkaline earth metal phosphorus salts whose anions have a reducing action assures a quick and effective treatment of the mineral lubricating oils in which they are present. The presence of colloidal alkaline earth metal phosphorus compounds in association with the overbased alkaline earth metal salts in such oils achieves a unique combination of oxidation inhibition, anticorrosion and sludge inhibition and dispersancy characteristics in such oils. This has not been attainable before because no good way has been found to intimately associate an inorganic oil-insoluble reducing agent with all parts of a mineral lubricating oil during its use. In much the same manner that the alkaline earth metal carbonate present in association with the overbased alkaline earth metal sulfonates renders the carbonate colloidal in nature, so that alkaline earth metal phosphorus compound is also carried in colloidal form in the same medium. If only a partial "neutralization" of the overbased portion of the sulfonate is carried out with the phosphorus oxy acid, the resultant product will contain both colloidal alkaline earth metal carbonate and alkaline earth metal phosphorus compounds of reducing nature.

Any of the alkaline earth metals may be employed and have been employed conventionally in the past in preparing the overbased sulfonates. These are selected from the group consisting of barium, strontium, calcium and magnesium. Calcium and barium are generally preferred because they are most readily available commercially and are usually cheapest.

Specific alkaline earth metal phosphites or hypophosphates, which may be present in colloidal form, and are formed in situ, are exemplified by the following compounds: barium pyrophosphite, barium hypophosphite, barium acid hypophosphite, calcium diorthophosphite, calcium monoorthophosphite, calcium hypophosphite, calcium pyrophosphite, calcium hypophosphate, calcium acid hypophosphate, magnesium hypophosphite, magnesium orthophosphite, magnesium acid hypophosphite, magnesium pyrophosphate and their analogous thio acid salts.

The overbased sulfonates are treated with sufficient excess alkalinity at their formation so that the total base number (TBN) of the overbased sulfonates employed as the reactants in the instant process will generally be between about 25 and about 400, although any overbased sulfonate having a TBN outside of this range may also be employed. The amount of lower oxy acid phosphorus or of corresponding oxide of phosphorus employed may be any amount sufficient to completely neutralize the free alkalinity of the overbased sulfonates or it may be a lesser amount to only partially neutralize the free alkalinity. It should never be used in excess of that amount for free lower oxy acid of phosphorus is not desired in the finished product. In general, a desirable finished product will contain both colloidal alkaline earth metal carbonates, for example, and colloidal alkaline earth metal reducing phosphorus salts. Hence, desirably, between about one-third and about two-thirds of the amount of lower oxy acid of phosphorus required to completely neutralize the free alkali of the overbased sulfonate is employed.

Care should also be taken in cases where the corresponding oxide or sulfide, i.e., anhydride of phosphorus is employed, that at least a small amount of water is present initially, for example, between about 0.5 and about 1.5 wt. percent in the overbased sulfonate employed. It will be appreciated that no formation of lower valent phosphorus compound through the use of anhydrides of phosphorus acids is possible unless and until sufficient water is present to at least initially hydrolyze at least a portion of the oxide or sulfide to the corresponding lower oxy acid of phosphorus. The temperature of reaction is not critical. The reaction, however, should be permitted to proceed slowly over a long period of time in order to avoid an undue amount of formation of large crystals of the alkaline earth metal phosphite or thiophosphite which only precipitates from the reaction mixture and are lost by ultimate filtration. The object is to produce as great a quantity of colloidal alkaline earth metal reduced phosphorus compound, in situ, as possible. This is brought about through the use of a temperature between about 75° C. and about 400° C. for a period of time between about one-half and about 13 hours. Preferably the temperature is maintained between about 100° C. and about 170° C. and the phosphorus reactant is added as oxide or acid slowly over a period of between about 2 and about 3 hours. This insures the formation of colloidal size alkaline earth metal phosphorus compounds.

In carrying out the reaction and using an oxide or sulfide of phosphorus, between about 0.4 and about 0.6 wt. percent of water as a minimum is employed per 100 units of total base number possessed by the overbased sulfonate being employed; in other words, if the sulfonate reactant has a TBN of 300, the amount of water present initially in the sulfonate should range between about 1.2 and about 1.8 wt. percent based on the sulfonate treated.

An alternative or optional method of forming the sulfonates containing colloidal phosphorus reducing compounds is also contemplated. This involves the complete or partial substitution of the lower oxy acid of phosphorus or its corresponding anhydride for the carbon dioxide or other acidic gas conventionally used in treating the sulfonate containing the excess and free alkaline agent such as calcium or barium oxide or hydroxide. Such treatment conventionally results in the formation of the carbonates of such alkaline earth metals in situ. As stated, a partial treatment with carbon dioxide followed by treatment with the selected phosphorus compound will result, for example, in a mixed carbonate-phosphite colloidal overbased sulfonate being formed. If no basic metal carbonate is desired in the final product, the carbon dioxide treatment is dispensed with and phosphorus trioxide or sulfide or phosphorous acid or thio phosphorous acid, for example, is used in its stead and, to the extend of the desired acidification, in order to control the final TBN attained.

The overbased alkaline earth metal sulfonates containing, in situ, colloidal reduced phosphorus compound are employed in any of the mineral lubricating oil fractions to which such untreated overbased alkaline earth metal sulfonates have heretofore been added. Mineral oil concentrates of the hereindescribed novel alkaline earth metal sulfonate salts may be prepared by employing a lubricating oil fraction as the reaction medium so that the final product will contain from about 30 to about 80 wt. percent (usually about 65–70 percent) of the novel sulfonate product. This concentrate may be added to the same or a different mineral lubricating oil fraction in a sufficient amount to have present in the oil between about 0.01 to about 10.0 wt. percent of the novel sulfonate product in the total oil composition.

The mineral lubricating oil fractions to which the sulfonates containing colloidal reducing phosphorus compounds are added may also contain other conventional additives such as, for example, ashless dispersants and detergents for example, the barium or calcium long chain alkyl phenol sulfides and phenates, long chain alkenyl succinimides, or pour point depressants, for example, the terpolymers of tallow fumarate or methacrylate, N-methyl methacrylate, beta amino methacrylate, the methacrylate polymers of long chain alcohols and wax alkylated naphthalene, antioxidants such as N-phenyl alpha or beta naphthylamine, phosphosulfurized alpha pinene, antiwear additives, such as zinc di($C_4$–$C_5$ alkyl) dithiophosphate prepared according to the process of U.S. Pat. No. 2,369,632 or tricresyl phosphate and various V.I. improvers, for example, polyisobutylene of 100,000 molecular weight and the like. These conventional additives when employed perform their usual functions and are not altered in those functions by reason of the presence of sulfonates containing the novel colloidal alkaline earth metal phosphite or other reducing phosphorus salts herein described.

In order to determine the effectiveness of the heretofore set forth procedure for modifying alkaline earth metal sulfonates to enhance their dispersant and sludge inhibiting characteristics, a sludge inhibiting bench test has been devised in which a sludge-containing used oil free of any added dispersants was centrifuged for 1 hour at 37,000 X gravity. The supernatant oil was separated from the insoluble sludge particles. This supernant used oil, however, does contain soluble sludge precursors which upon heating as described below may form additional oil-insoluble sludge deposits. In a tared stainless steel centrifuge tube, 10 grams of a 0.5 to 5.0 wt. percent active ingredient solution of the additive being tested was added to the oil and was heated to 300° F. for 2 hours in a constant temperature oil bath. After this heating, the tubes were cooled and were then centrifuged for 1 hour at 37,000 X gravity. The supernatant oil was then decanted again from the tube and any residual deposits of sludge were washed carefully with 99 percent n-pentane to remove all remaining oil. The weight, in milligrams, of the sludge formed in the test was then determined. A blank or comparative run was also carried out in which no additive was employed in the used oil. A substantial decrease in the amount of sludge deposited, as compared with the amount deposited, collected and weighed in the case of the blank or control run, using the same used oil, is an indication that the additive has a substantial sludge inhibiting effect.

A further test was carried out known as the Ford Cyclic Temperature Sludge Test. It is designed to evaluate the sludge handling ability of lubricating oil additives tested. In this test the temperature of the oil is cyclically and sequentially varied, with periodical inspection of the engine at given hours in order to determine the stability and the sludge inhibiting and sludge dispersing ability of the additives being tested. A Ford six-cylinder engine is used. The engine is operated at a standard speed of 1,500 rpm ± 15 rpm at a constant load of about 140, ± 2 ft. pounds of torque. The oil sump temperature is maintained for 5 hours in the cold phase at 150° F. ± 5° F. followed by a hot phase operation lasting 2 hours where the oil sump temperature is maintained at 215° F. ± 5° F. The cold phase and hot phase are alternated for the total number of hours shown for the test. Makeup oil is added as required so as to maintain the oil level in the crankcase at all times between 5 and 5 ½ quarts. At the end of selected periods of test time the engine was inspected by disassembling it sufficiently to permit visual examination of each of the parts including the rocker arm assembly, rocker arm cover, the cylinder head, the piston rod chamber and its cover, the crank shaft and the oil pan. These parts were visually and quantatatively rated for sludge deposits using the CRC (Coordination Research Council) sludge merit rating system in which a merit rating of 10 represents a perfectly clean part and with the merit scale numbers decreasing to indicate the degree of sludge formation and deposition. The sludge merit ratings of the various parts are averaged to give an overall engine rating. The oils employed in association with the novel prepared additives of the present invention are those customarily employed in lubricating internal combustion engines such as spark ignition engines, diesel engines both of the ordinary truck and heavy duty types and in fact any engine employing lubricating oils for the purpose of lubricating the piston walls, valves, and bearings of such engines.

The invention is not limited to the use of any particular lubricating oil but is applicable to all lube oils heretofore conventionally used in lubricating internal combustion engines. These oils may be of the paraffinic, naphthenic, or mixed type and as before stated they may contain conventional additives which are customarily employed in such oils for improving the viscosity indexes, pour point, antioxidant, antiwear, sludge dispersancy and other characteristics of such oils.

As illustrative of the character of the invention, the following examples and tests are described.

EXAMPLE 1

660 grams of an overbased concentrate of calcium petroleum sulfonate, containing about 0.3 wt. percent of water (TBN 300) containing about 59 wt. percent active ingredient in a commercially available solvent refined neutral mineral lubricating oil of about 150 SUS at 100° F. (see product of Example 1 of U.S. Pat. No. 3,429,811) was heated and had added thereto, slowly, a total of about 130 grams of ortho phosphorous acid at a temperature of 130° C. over a period of about 2 hours. The admixture was held at this temperature for an additional 20 minutes after all of the ortho phosphorous acid had been added. The temperature of the reaction mixture was then raised to about 150°–170° C. and held there until substantially all of the water of condensation had been stripped off under a vacuum at 3–20 mm. of Hg. The final product was then filtered and the clear dark colored liquid was found to contain 2.25 wt. percent phosphorus and 6.80 wt. percent calcium. A conventional compounded automotive lubricating oil of 10W–30 grade was employed as a base oil for carrying out the heretofore described cyclic temperature sludge test. It contained about 10 percent of polyisobutylene of 100,000 molecular weight, about 1.2 wt. percent of zinc di($C_4$–$C_5$ alkyl) dithiophospate, about 1 percent of a synthetic long chain alkaryl overbased calcium sulfonate of about 420 molecular weight, about 3.8 percent of a polyisobutylene succinic anhydride condensation product with tetraethylenepentamine and about ½ percent of wax alkylated naphthalene. The following merit ratings were obtained using the compounded oil containing the novel additive as compared with the same compounded oil minus the additive of Example 1.

| Hour | Base oil Containing 2.5 Wt. % Colloidal Ca Phosphite Sulfonate Additive Merit Rating | Base Oil With No Novel Additive Merit Rating |
| --- | --- | --- |
| 63 | 9.55 | 9.26 |
| 84 | 9.48 | 6.8 |
| 105 | 8.5 | 5.5 |
| 126 | 6.75 | |
| 147 | 5.1 | |

It is apparent from these data that after a total of 105 hours of test, the oil containing the novel additive, has a merit rate of 8.5 whereas the oil containing no novel additive, after the same length of time, had a merit rating of only 5.5.

Further tests were undertaken to determine the amount of sludge formed from used oil which oil had been used in taxicab crankcases for 25,000 miles, and was filtered, before being employed in the sludge inhibiting bench test, as previously described. The control sample, when subjected to the test showed a deposition of 10.3 milligrams of sludge; the same oil, on a comparative basis, showed 5.5 milligrams of sludge deposits, where 1 wt. percent of the product of Example 1 was added, 3.3 milligrams of sludge deposits, where 3 wt. percent of the product of Example 1 was used and only 2.6 milligrams of sludge deposits where 5 wt. percent of the product of Example 1 was used. Similarly, the untreated sulfonate starting material of Example 1 was tested in the same used oil. The test results were as follows: 7.1 milligrams of sludge using 1 wt. percent of the untreated starting material of Example 1, 5.2 milligrams using 3 wt. percent, and 5 milligrams using 5 wt. percent. The presence of the colloidal calcium phosphite in association with the overbased calcium petroleum sulfonates exhibits markedly increased diminution in the amount of sludge actually produced under the conditions of the test.

EXAMPLE 2

About 2,500 grams of the same oil concentrate of overbased calcium petroleum sulfonate as was used in Example 1 was admixed with about 250 grams of polyisobutylene of about 780–800 number average molecular weight which had been first treated with about 15 percent of its weight with phosphorus pentasulfide, at a temperature of about 425°–440° F. This admixture was heated to about 115° F. and over a period of about 1 hour, about 67 grams of phosphorus sesquisulfide ($P_4S_3$) was added after which the heating was increased to about 150° F. to strip off water and thereafter soaked at the same raised temperature for an additional 15 minutes following the water removal step. The product was filtered and portions thereof added to a used oil and subjected to the heretofore described sludge inhibition bench test.

The used oil containing 1.0 wt. percent of the oil concentrate of overbased calcium petroleum sulfonate (starting material of Examples 1 and 2) gave 12.0 milligrams of sludge deposits and at 3 wt. percent added, 3.7 milligrams of sludge. One percent of the product of Example 2 in another aliquot of the same used oil resulted in 4.9 milligrams of sludge and at 3.0 wt. percent of the Example 2 product, 0.9 milligrams of sludge deposits.

Having now thus fully described and illustrated the invention, what is desired to be secured by Letters Patent is:

1. A liquid composition of matter comprising an oil-soluble alkaline earth metal sulfonate material containing a colloidal oil-insoluble alkaline earth metal salt of a lower oxy acid or thio acid of phosphorus or of an anhydride thereof, wherein said metal salt is a reducing agent, said material having been formed by reacting oil - soluble overbased alkaline earth metal hydrocarbon sulfonate with lower oxy acid or thio acid of phosphorus or of an anhydride thereof.

2. A composition as in claim 1 wherein the sulfonate containing the colloidal phosphorus salt is prepared by forming the phosphorus salt in situ by treating an overbased alkaline earth metal sulfonate with up to the stoichiometric amount of said lower oxy acid or thio acid of phosphorus or of an anhydride thereof required to completely neutralize the free alkalinity of the sulfonate.

3. A composition as in claim 2 wherein the phosphorus acid is orthophosphorous acid and the sulfonate is calcium petroleum sulfonate of about 900 number average molecular weight and a total base number of about 300.

4. A composition as in claim 2 wherein the phosphorus acid is orthophosphorous acid and the sulfonate is calcium long chain alkyl substituted aryl sulfonate of about 840 number average molecular weight and a total base number of about 300.

5. A composition as in claim 2 wherein only from about one-third to about two-thirds of the stoichiometric amount of the acid of phosphorus is employed.

6. A composition as in claim 2 wherein said phosphorus acid is the anhydride or corresponding oxide of phosphorus and the overbased alkaline earth metal sulfonate contains at least 0.5 wt. % of water.

7. A composition as in claim 1 wherein said lower oxy acid of phosphorus is selected from the group consisting of hypophosphorous acid, metaphosphorous acid, pyrophosphorous acid, orthophosphorous acid, hypophosphoric acid, phosphorus trioxide, phosphorus sesquioxide, and phosphorus tetraoxide and the analogous thio acids and sulfides thereof and the alkaline earth metal is selected from the group consisting of barium, strontium, calcium and magnesium.

8. A composition as in claim 7 wherein said acid of phosphorus is the thio anhydride, phosphorus sesquisulfide.

9. A mineral lubricating oil containing a sludge inhibiting amount of a liquid oil-soluble alkaline earth metal sulfonate material containing a colloidal oil-insoluble alkaline earth metal salt of a lower oxy acid or thio acid of phosphorus or of an anhydride thereof, wherein said metal salt is a reducing agent, said material having been formed by reacting oil - soluble overbased alkaline earth metal hydrocarbon sulfonate with lower oxy acid or thio acid of phosphorus or of an anhydride thereof.

10. A mineral lubricating oil as in claim 9 wherein the sulfonate containing the colloidal phosphorus salt is prepared by forming the phosphorus salt in situ by treating an overbased alkaline earth metal sulfonate with up to the stoichiometric amount of a lower oxy acid or thio acid of phosphorus or of an anhydride thereof required to completely neutralize the free alkalinity of the sulfonate.

11. A mineral lubricating oil as in claim 10 wherein said phosphorus acid is orthophosphorous acid and the sulfonate is calcium petroleum sulfonate of about 900 number average molecular weight and a total base number of about 300.

12. A mineral lubricating oil as in claim 10 wherein said phosphorus acid is orthophosphorous acid and the sulfonate is calcium long chain alkyl substituted aryl sulfonate of about 840 number average molecular weight and a total base number of about 300.

13. A mineral lubricating oil as in claim 10 wherein only from about one-third to about two-thirds of the stoichiometric amount of said acid of phosphorus is employed.

14. A mineral lubricating oil as in claim 10 wherein said phosphorus acid is the anhydride or corresponding oxide of phosphorus and the overbased alkaline earth metal sulfonate contains at least 0.5 wt. percent of water.

15. A mineral lubricating oil as in claim 9 wherein said lower oxy acid of phosphorus is selected from the group consisting of hypophosphorous acid, metaphosphorous acid, pyrophosphorous acid, orthophosphorous acid, hypophosphoric acid, phosphorus trioxide, phosphorus sesquioxide, and phosphorus tetraoxide and the analogous thio acids and sulfides thereof, and the alkaline earth metal is selected from the group consisting of barium, strontium, calcium and magnesium.

16. A mineral lubricating oil as in claim 15 wherein the acid of phosphorus is the thio anhydride, phosphorus sesquisulfide.

17. An oil concentrate comprising a lubricating oil and 30 to 80 wt. percent of the composition of claim 1.

18. A composition according to claim 2 wherein said reaction is carried out at substantially ambient pressures.

19. A lubricating oil according to claim 10 wherein said reaction is carried out at substantially ambient pressures.

20. A composition according to claim 1 wherein said lower oxy acid of phosphorus contains only elements selected from the group consisting of phosphorus, oxygen, sulfur, hydrogen and combinations thereof.

21. A composition according to claim 2 wherein said lower oxy acid of phosphorus contains only elements selected from the group consisting of phosphorus, oxygen, sulfur, hydrogen and combinations thereof, and said neutralization is carried out at substantially ambient pressures.

22. A lubricating oil according to claim 9 wherein said lower oxy acid of phosphorus contains only elements selected from the group consisting of phosphorus, oxygen, sulfur, hydrogen and combinations thereof.

23. A lubricating oil according to claim 10 wherein said lower oxy acid of phosphorus contains only elements selected from the group consisting of phosphorus, oxygen, sulfur, hydrogen and combinations thereof, and said neutralization is carried out at substantially ambient pressures.

* * * * *